United States Patent
Wu et al.

(10) Patent No.: US 9,792,789 B2
(45) Date of Patent: Oct. 17, 2017

(54) METHOD AND DEVICE FOR TRANSMITTING AN ALERT MESSAGE

(71) Applicant: Xiaomi Inc., Beijing (CN)

(72) Inventors: Ke Wu, Beijing (CN); Xinyu Liu, Beijing (CN); Huayijun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/083,402

(22) Filed: Mar. 29, 2016

(65) Prior Publication Data

US 2017/0103627 A1 Apr. 13, 2017

(30) Foreign Application Priority Data

Oct. 12, 2015 (CN) .......................... 2015 1 0659383

(51) Int. Cl.
- *G08B 13/10* (2006.01)
- *G08B 13/02* (2006.01)
- *H04L 29/08* (2006.01)
- *G08B 13/196* (2006.01)

(52) U.S. Cl.
CPC ....... *G08B 13/02* (2013.01); *G08B 13/19695* (2013.01); *H04L 67/12* (2013.01)

(58) Field of Classification Search
CPC .......... G08B 1/08; G08B 13/02; G08B 13/08; G08B 13/10; G08B 13/12; G08B 13/19695; G08B 13/19608; G08B 13/19613; G08B 13/1436; G08B 13/1472
USPC ...... 340/539.11, 541, 665, 666; 73/760, 763
See application file for complete search history.

(56) References Cited

U.S. PATENT DOCUMENTS

| | | | |
|---|---|---|---|
| 4,347,505 A * | 8/1982 | Anderson | G01L 1/20 177/210 R |
| 4,888,581 A * | 12/1989 | Guscott | G08B 21/0469 200/61.93 |
| 6,822,555 B2 * | 11/2004 | Mansfield, Jr. | G08B 25/06 340/538 |
| 2004/0249890 A1 | 12/2004 | Fellenstein et al. | |
| 2005/0179553 A1 | 8/2005 | Fujie | |
| 2007/0090969 A1 * | 4/2007 | Eiza | G08B 13/10 340/870.07 |

(Continued)

FOREIGN PATENT DOCUMENTS

| | | |
|---|---|---|
| CN | 101894403 A | 11/2010 |
| CN | 102339514 A | 2/2012 |

(Continued)

OTHER PUBLICATIONS

International Search Report of PCT/CN2015/098436, mailed from the State Intellectual Property Office of China dated Jul. 18, 2016.

(Continued)

*Primary Examiner* — Hung T Nguyen
(74) *Attorney, Agent, or Firm* — Finnegan, Henderson, Farabow, Garrett & Dunner LLP

(57) ABSTRACT

A method for transmitting an alert message is disclosed. The method may include obtaining physical characteristic data of a target object on a target device, and transmitting a first alert message to a first terminal, if the obtained physical characteristic data of the target object does not match pre-stored physical characteristic data of a target user.

16 Claims, 16 Drawing Sheets

(56) References Cited

U.S. PATENT DOCUMENTS

| | | | |
|---|---|---|---|
| 2007/0237358 A1 | 10/2007 | Tseng et al. | |
| 2009/0243852 A1* | 10/2009 | Haupt | G01W 1/00 340/541 |
| 2011/0289426 A1 | 11/2011 | Sonstegard et al. | |
| 2011/0296505 A1 | 12/2011 | Perez et al. | |
| 2015/0114763 A1* | 4/2015 | Kim | B66B 5/0012 187/392 |

FOREIGN PATENT DOCUMENTS

| | | |
|---|---|---|
| CN | 202167123 U | 3/2012 |
| CN | 202859498 U | 4/2013 |
| CN | 103473889 A | 12/2013 |
| CN | 203596087 U | 5/2014 |
| CN | 103955179 A | 7/2014 |
| CN | 104274158 A | 1/2015 |
| CN | 204087428 U | 1/2015 |
| CN | 104332037 A | 2/2015 |
| CN | 104484968 A | 4/2015 |
| CN | 104574745 A | 4/2015 |
| CN | 204331938 U | 5/2015 |
| EP | 1744289 A1 | 1/2007 |
| EP | 1968023 A2 | 9/2008 |
| JP | 2010-66791 A | 3/2010 |
| JP | 2010-178202 A | 8/2010 |
| JP | 2011-254954 | 12/2011 |
| JP | 2014-180312 A | 9/2014 |
| KR | 10-2015-0022297 A | 3/2015 |
| KR | 10-2015-0033402 A | 4/2015 |
| KR | 10-2015-0048500 A | 5/2015 |
| RU | 2013116631 A | 8/2013 |
| WO | WO 00/75417 A1 | 12/2000 |
| WO | WO 2014/085500 A1 | 6/2014 |

OTHER PUBLICATIONS

Extended European Search Report of European Patent Application No. 16163379.7, from the European Patent Office, dated Mar. 3, 2017.

Office Action for Korean Application No. 10-2016-7004679, mailed from the Korean Intellectual Office on Apr. 4, 2017.

Office Action for Russian Application No, 2016110155/12(016031), mailed from the Russian Federal Service for Intellectual Property dated Apr. 28, 2017.

* cited by examiner

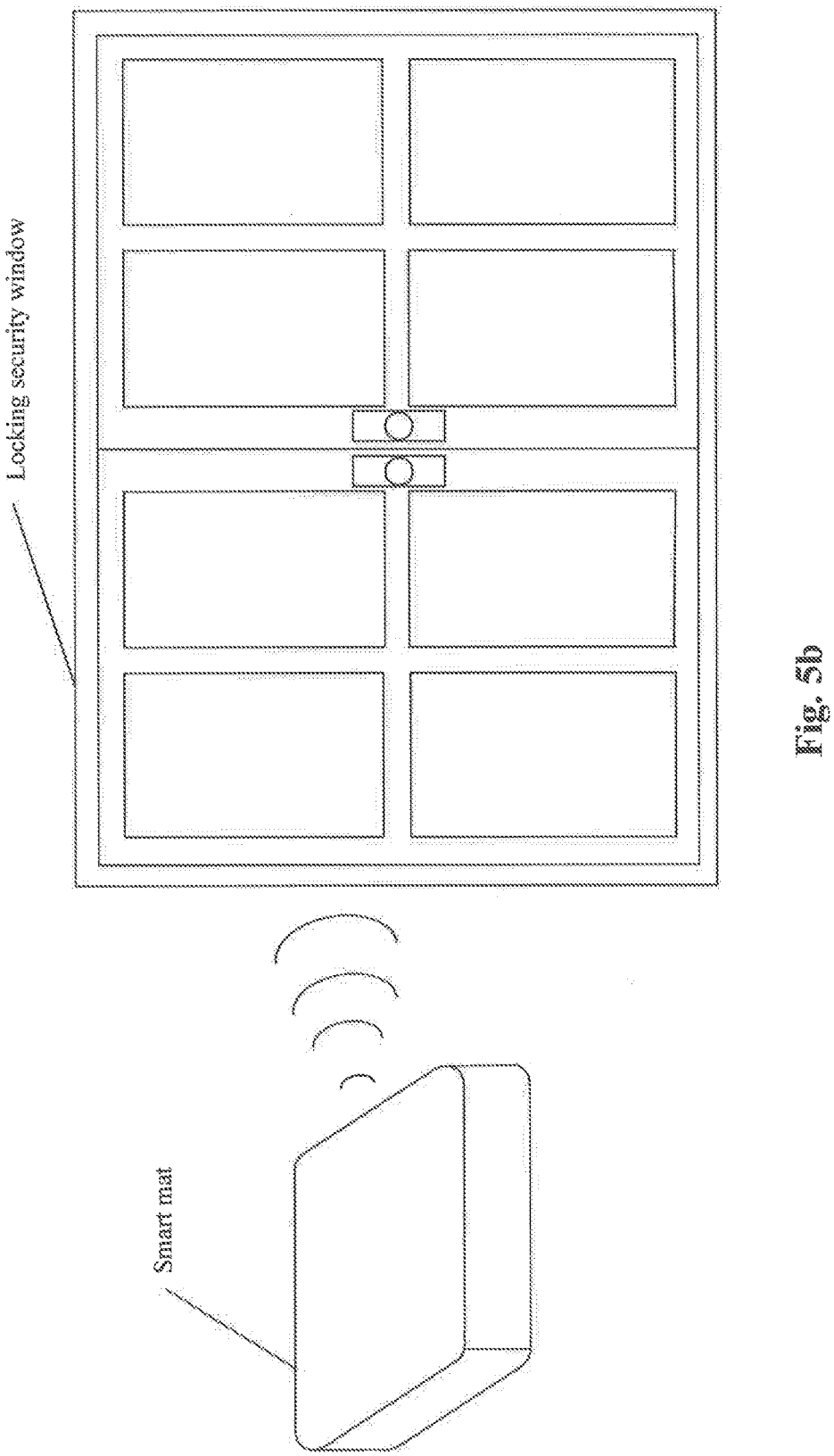

METHOD AND DEVICE FOR TRANSMITTING AN ALERT MESSAGE

CROSS-REFERENCE TO RELATED APPLICATION

This application is based upon and claims priority to Chinese Patent Application No. 201510659383.8, filed on Oct. 12, 2015, which is incorporated herein by reference in its entirety.

FIELD

The present disclosure generally relates to the computer technology field and, more particularly, to a method and a device for transmitting an alert message.

BACKGROUND

With the development in the mobile terminal technology, mobile terminals have been commonly used in people's daily life. This trend has many implications.

In one aspect, most people are serious about safeguarding private properties. Some of them have a security door in their home to prevent intruders from entering their home. The security door usually includes an alarm device. When an intruder attempts to break through the security door, the alarm device can trigger a siren.

However, when the intruder breaks into the house through other passage ways, such as a window, the security door may not be able to detect the breach and leave private properties inside the house unprotected.

SUMMARY

One aspect of the present disclosure is directed to a method for transmitting an alert message. The method may comprise obtaining physical characteristic data of a target object on a target device, and transmitting a first alert message to a first terminal, if the obtained physical characteristic data of the target object does not match pre-stored physical characteristic data of a target user.

Another aspect of the present disclosure is directed to a device for transmitting an alert message. The device may comprise a processor and a memory for storing processor-executable instructions. The processor may be configured to obtain physical characteristic data of a target object on a target device and transmit a first alert message to a first terminal, if the obtained physical characteristic data of the target object does not match pre-stored physical characteristic data of a target user.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIGS. 5a-5b are schematic diagrams illustrating application scenarios, according to exemplary embodiments.

The above figures have illustrated specific embodiments of the disclosure, the more detailed description will be provided hereinafter. These figures and description are not intended to limit the scope of the disclosure in any manner, but just describe the concept of the disclosure to those skilled in the art by referring to the specific embodiments.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

Figure 1:
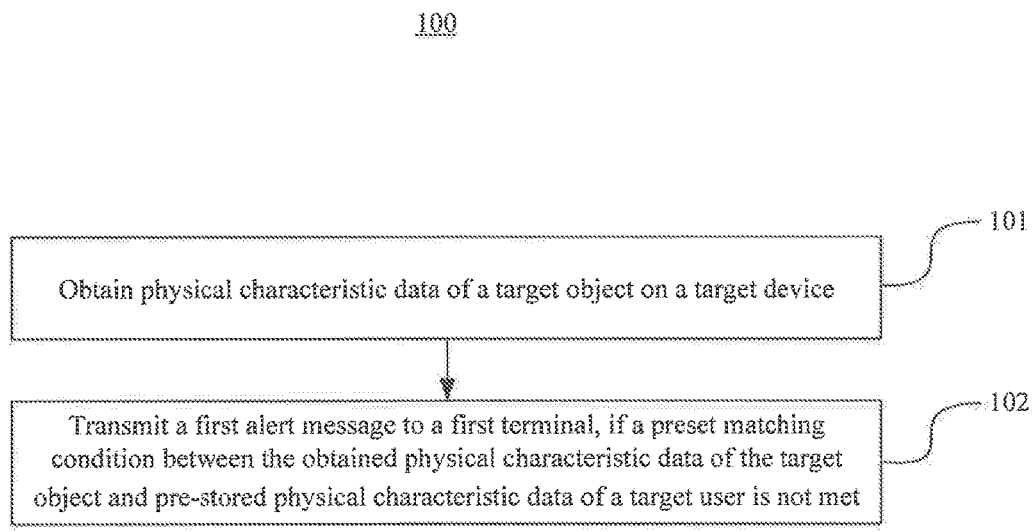
FIG. 1 is a flow diagram illustrating a method for transmitting an alert message, according to an exemplary embodiment.

FIG. 1 is a flow diagram illustrating a method 100 for transmitting an alert message, according to an exemplary embodiment. The method 100 may be implemented by a target device described below. The method 100 may also be implemented by a device for transmitting an alert message described below. As shown in FIG. 1, the method 100 may include the following steps.

In step 101, physical characteristic data of a target object on a target device is obtained.

In step 102, a first alert message is transmitted to a first terminal, if a preset matching condition between the obtained physical characteristic data of the target object and pre-stored physical characteristic data of a target user is not met. For example, the obtained physical characteristic data of the target object does not match the pre-stored physical characteristic data of the target user.

In one embodiment of the disclosure, a preset matching condition between obtained physical characteristic data of a target object and pre-stored physical characteristic data of a target user can indicate if the target object is the target user, and trigger transmitting to a first terminal a first alert message if the matching condition is not met (e.g. if the target object is not determined to be the user). Thus, security of the target user's property can be improved.

Another exemplary embodiment of the disclosure provides a method for transmitting an alert message. The method can be implemented by a target device configured to carry a person, such as a smart mat/carpet/rug, a smart chair, a smart floor, or the like. The embodiment uses the smart mat as an exemplary target device. The target device may include a sensor, a processor, and a memory. The sensor may be configured to obtain physical characteristic data of a target object on the target device. The processor may be configured to determine whether a preset matching condition between the obtained physical characteristic data of the target object and pre-stored physical characteristic data of a target user is met (e.g. determine whether the obtained physical characteristic data of the target object matches the pre-stored physical characteristic data of the target user). The memory may be a non-transitory computer-readable storage medium storing instructions that, when executed by the process, cause the processor to perform the steps described. The memory may be configured to store data required by the above steps, data generated by the above steps and the physical characteristic data of the target user. The target device may include a transceiver. The transceiver may be configured to transmit an alert message to a terminal or transmit a control command to a controlled device if the preset matching condition is not met. The target device may further include a power supply, or the like.

In some embodiments, in step 101, the physical characteristic data may indicate physical characteristics of a person, and the physical characteristic data may include pressure data, contact area data, temperature data, and weight data, or the like.

Figure 2:
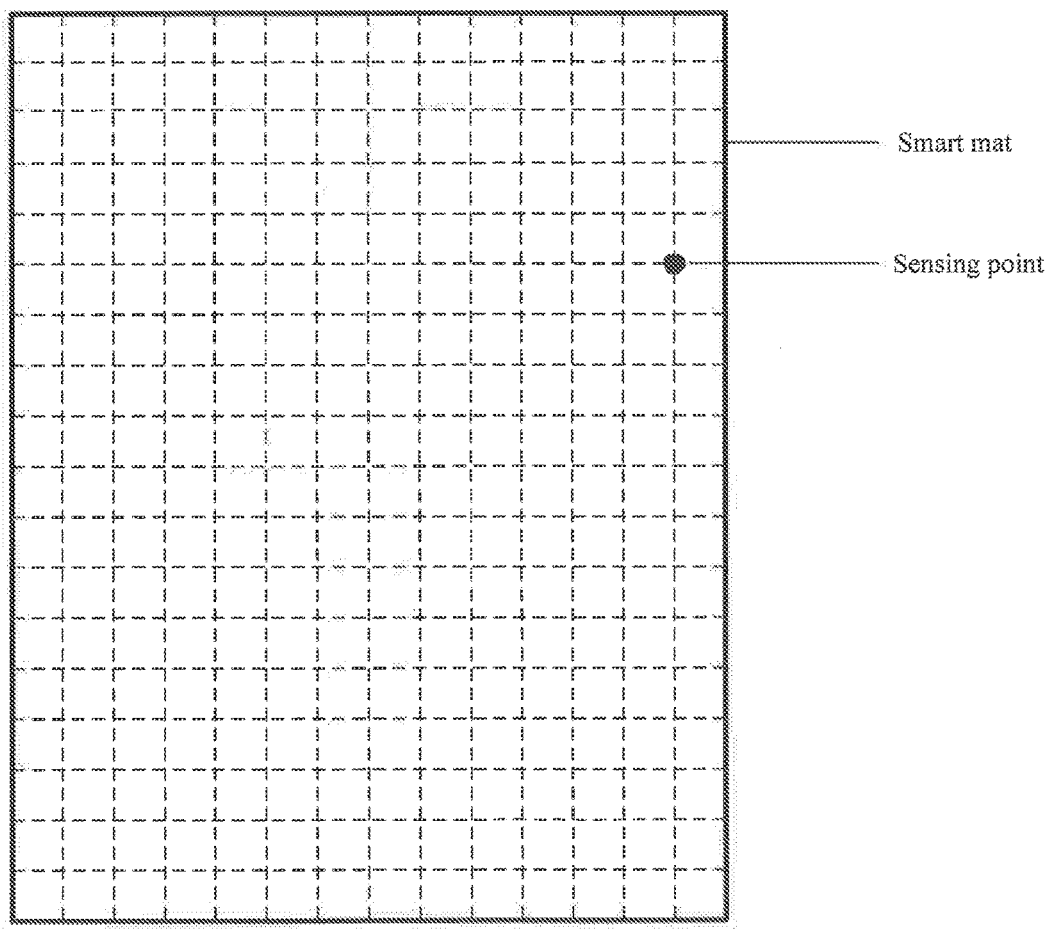
FIG. 2 is a schematic diagram illustrating an application scenario, according to an exemplary embodiment.

In an embodiment, a smart mat, being used as the target device, may include a plurality of sensing points each connected with a sensor, such as a pressure sensor, a temperature sensor, or the like. These sensing points can be evenly distributed on the smart mat, as shown in FIG. 2, at every cross-point of two dash lines. When a target object (e.g. a person) is on the smart mat, physical characteristic data of the target object may be detected by the sensors via the sensing points. For example, a pressure applied by the target object to the smart mat may be detected by a pressure sensor. The smart mat may be further configured to calculate a weight of the target object based on the detected pressure data. Furthermore, when the smart mat detects the pressure data of the target object, it may ignore outlier pressure data, such as smaller-than-average data obtained from edges of the mat, and average non-outlier pressure data to obtain final pressure data.

The smart mat may also be configured to detect a contact area of the target object contacting the smart mat. The smart mat may be configured to count a first number of the sensing points generating the physical characteristic data, e.g., those in contact with the target object, and calculate a ratio between the first number and a total number of the sensing points. The smart mat may be configured to obtain a top area of itself, and multiply the top area by the ratio to get the contact area of the target object. Alternatively, the smart mat may be configured to pre-store an area corresponding to each sensing point, and multiply the area corresponding to each sensing point by the first number to obtain the contact area data of the target object. The area of each sensing point can be determined, for example, by dividing the total top area of the smart mat the total number of sensing sensors to get the area corresponding to the each sensing point. Alternatively, the area of each sensing point can be determined based on positions of the sensing points on the smart mat, for example, areas corresponding to the sensing points located near to a center of the smart mat are assigned to larger values, and areas corresponding to the sensing points located at edges of the smart mat are assigned to smaller values. After the smart mat detects the pressure data and the area data of the target object, the smart mat may calculate a ratio between the pressure data and the area data to obtain pressure intensity data of the target object.

Furthermore, the smart mat may further detect a shape of the contact area of the target object. For example, the sensing points of the smart mat may be dense, and the smart mat can determine the shape of the contact area of the target object based on positions of the sensing points that have detected the pressure data and/or the weight data.

In some embodiments, the smart mat may determine whether the target object is a person. Accordingly, the step 101 may include: obtaining a pressure, a contact area, and a temperature of a target object on the target device, and determining the target object to be a person and obtaining the physical characteristic data of the target object, if the obtained pressure, the obtained contact area, and the obtained temperature of the target object meet a preset physical characteristic condition.

In an embodiment, the smart mat may pre-store the physical characteristic condition, and the physical characteristic condition may include a pressure range, a contact area range, and a temperature range. For example, the pressure range of a person pressing on the smart mat may be 500N to 2500N, the contact area range of a person contacting the smart mat may be 10 cm$^2$ to 1 m$^2$, and the temperature range may be 30° C. to 37° C. Furthermore, the smart mat may pre-store a pressure intensity range of a person applying on the smart mat. The smart mat may detect the pressure, the contact area, and the temperature of the target object on the smart mat, then the smart mat may determine whether the pressure of the target object falls into the pressure range, whether the contact area of the target object falls into the contact area range, and whether the temperature of the target object falls into the temperature range. The smart mat may further determine whether the pressure intensity of the target object falls into the pressure intensity range. If all of the pressure, the contact area, the temperature and the pressure intensity of the target object fall into the corresponding ranges, the target object can be determined as a person, and then the physical characteristic data of the target object can be obtained, In some embodiments, in step 102, the first terminal may be a portable smart device, such as a mobile phone, a smart bracelet, or the like.

In an embodiment, the smart mat may pre-store the physical characteristic data of the target user. The smart mat may pre-store the pressure data, the contact area data, or the like of the target user landed on the smart mat in different postures. The smart mat may also obtain pressure data and contact area data, calculate the pressure intensity data based on the obtained pressure data and contact area data, arid correspondingly store the calculated pressure intensity data. Furthermore, the smart mat may also obtain and store the shapes of the contact areas and position relationships among the contact areas, corresponding to the different postures, obtain the pressure data based on the position relationships among the contact areas and the shapes of the contact areas, and perform the match between the obtained physical characteristic data of the target object and the pre-stored physical characteristic data of the target user described in step 102.

Figure 3A:
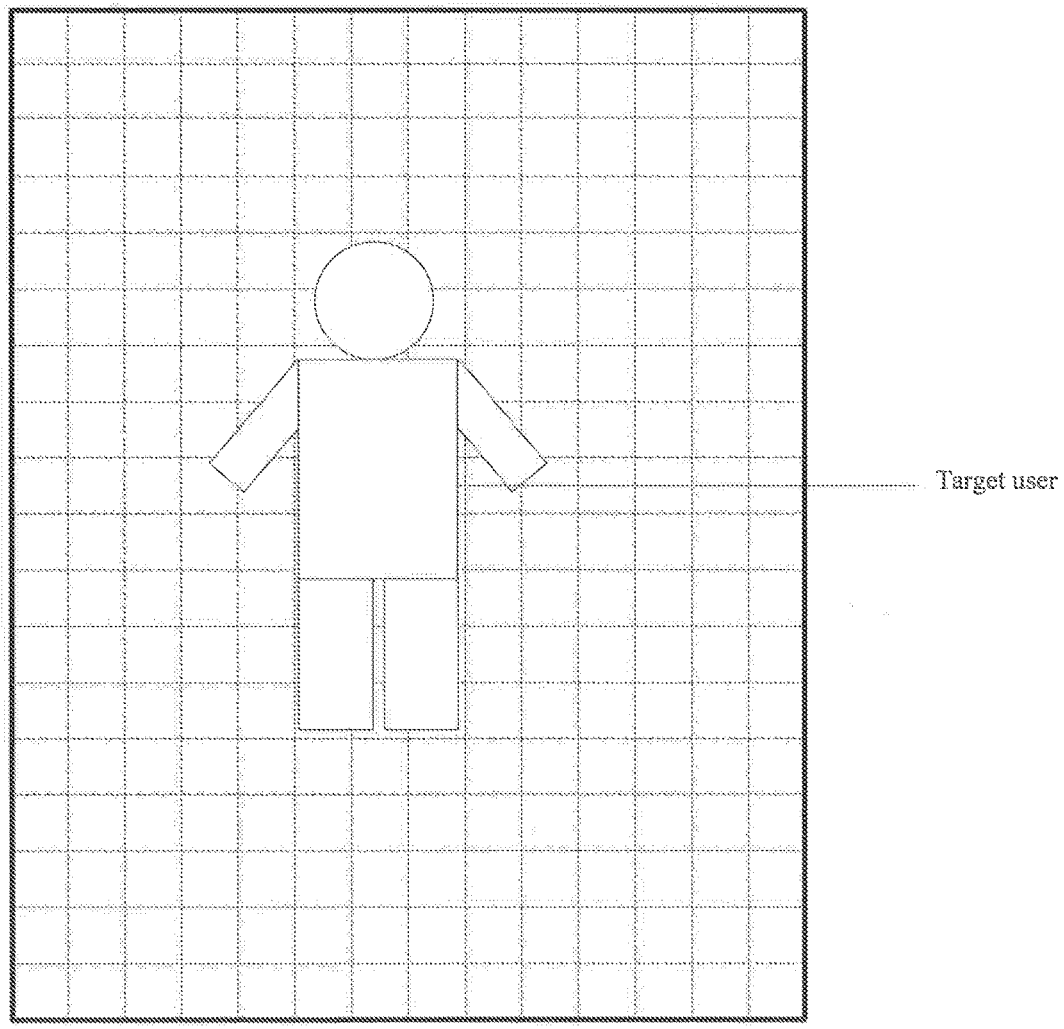
FIGS. 3a-3d are schematic diagrams illustrating application scenarios, according to exemplary embodiments.
Figure 3B:
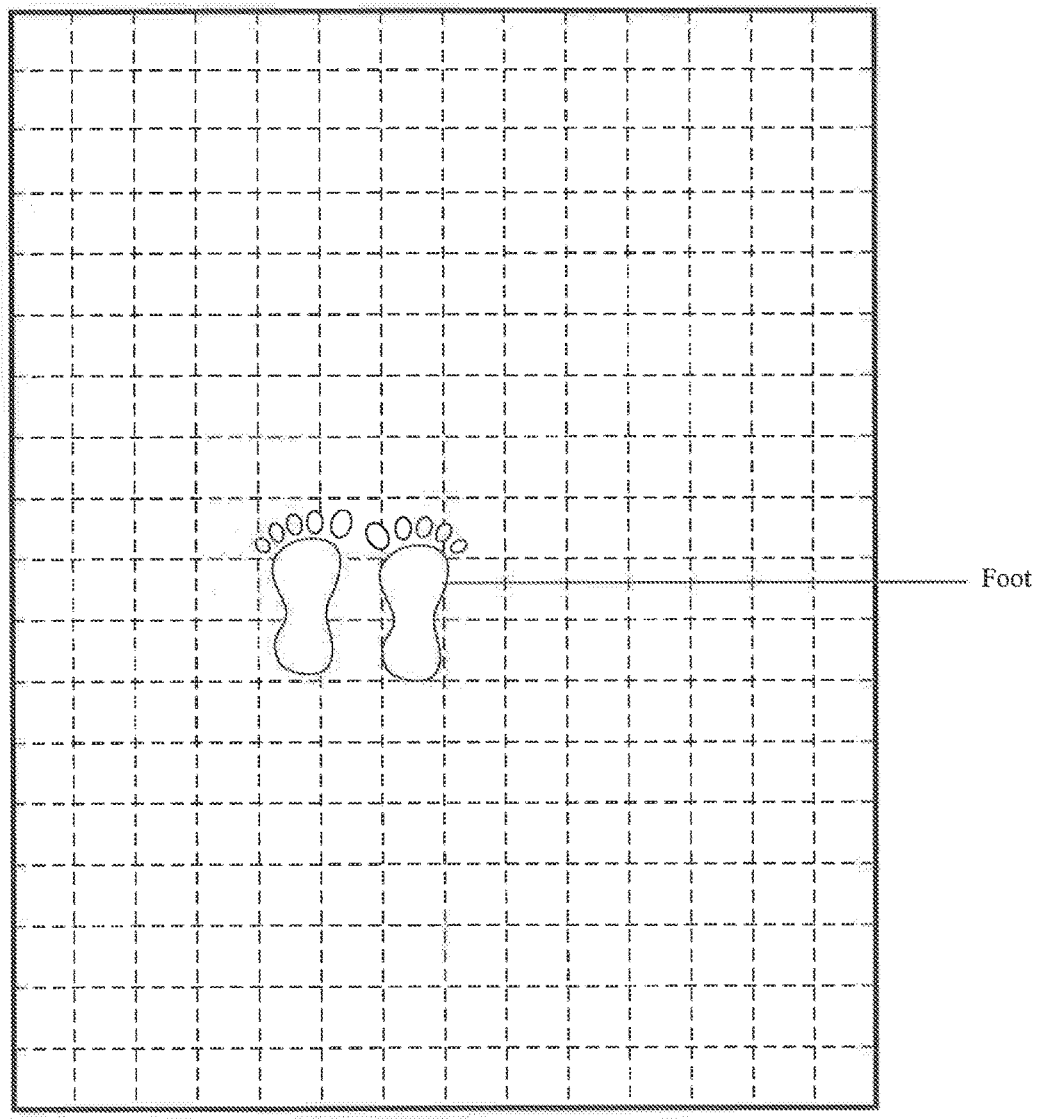
Figure 3C:
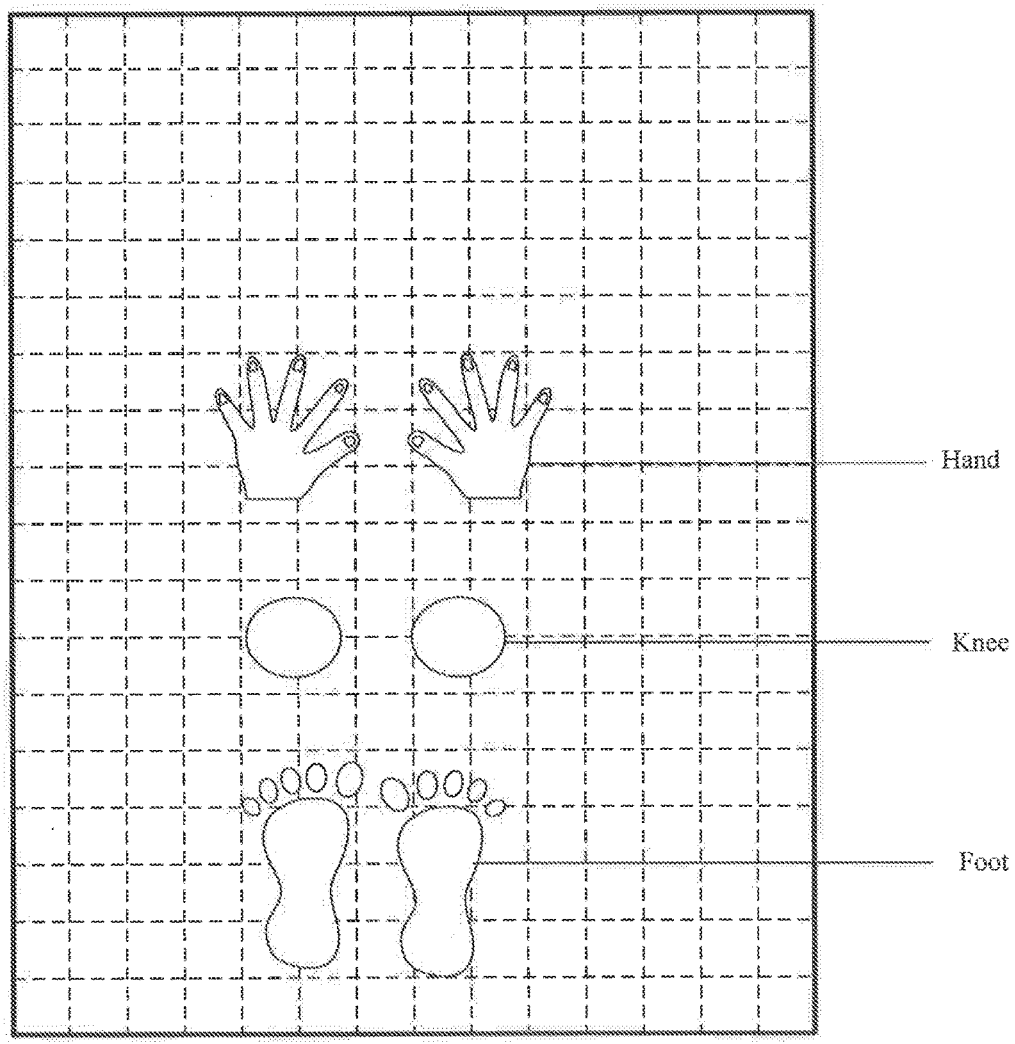
Figure 3D:
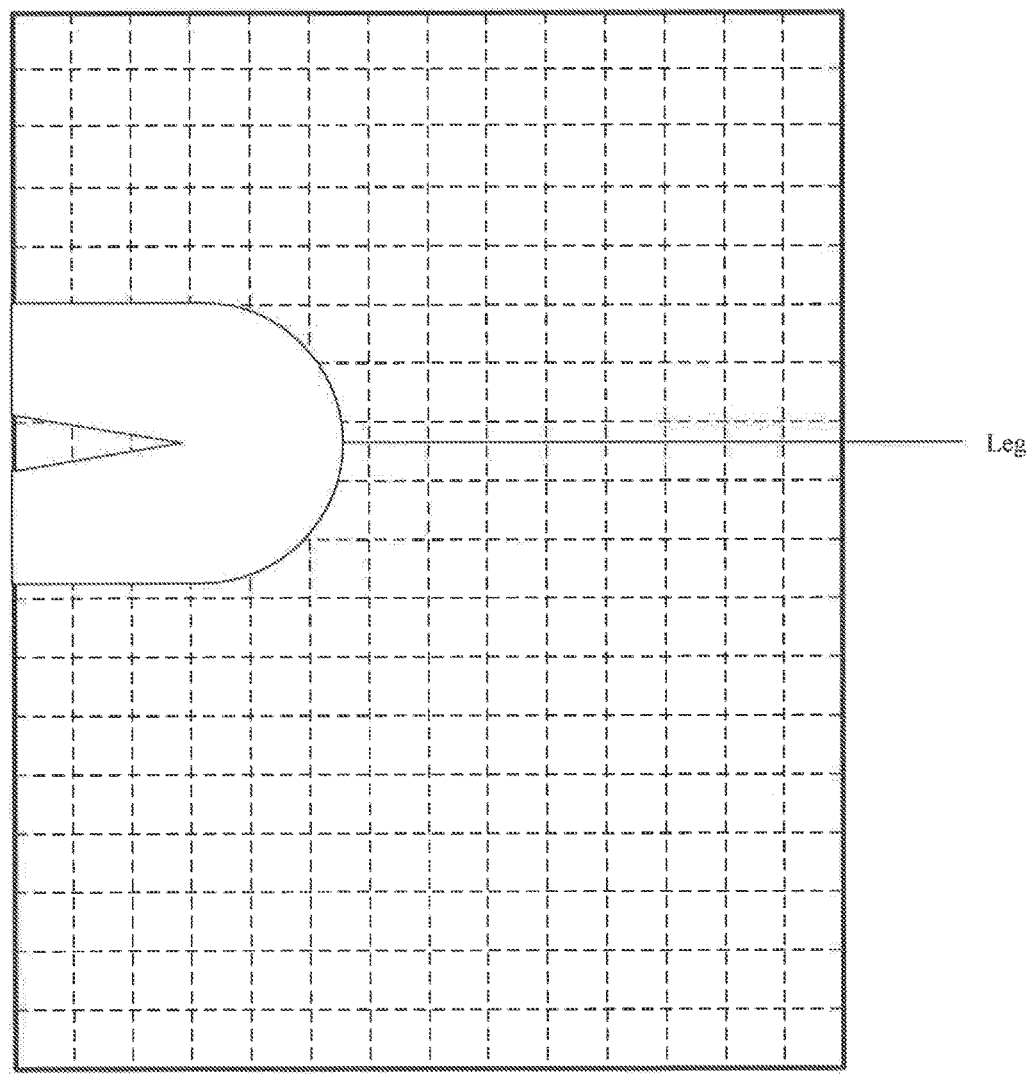

The pressure data, the contact area data, the pressure intensity data, or the like obtained corresponding to a certain posture may be referred to as a set of physical characteristic data. For example, corresponding pressure data, contact area data, and shapes of contact areas may be obtained and stored when a target user lies flat on the smart mat, as shown in FIG. 3a. Corresponding pressure data, contact area data, and shapes of contact areas may also be obtained and stored when the target user stands on the smart mat, as shown in FIG. 3b, and an obtained position relationship between two contact areas may indicate that a distance between the two contact areas is less than twice the length of a leg. Corresponding pressure data, contact area data, and shapes of contact areas may also be obtained and stored when the target user lies on the smart mat with feet, knees, and hands, as shown in FIG. 3c, and obtained position relationships among four contact areas may indicate that distances between the hands and the feet are less than the height of the target user. The physical characteristic data of the target user may also be obtained and stored when the target user sits on the smart mat, as shown in FIG. 3d. Furthermore, the postures of the target user may include a posture of the target user standing on the smart mat with one foot, a posture of the target user contacting the mat with two feet and one hand, a posture of the target user contacting the mat with one hand and two foots, or the like.

The smart mat may pre-store physical characteristic data of the persons with different heights and weights on the smart mat in different postures. The target user may input his/her height and weight into a control component of the smart mat, and the smart mat may calculate physical characteristic data corresponding to different postures on the smart mat, based on the inputted height and weight of the target user and the pre-stored physical characteristic data of people of different heights and weights on the smart mat in different postures. Furthermore, the target user may make different postures on the smart mat, and the smart mat may obtain and store corresponding physical characteristic data.

Figure 4:
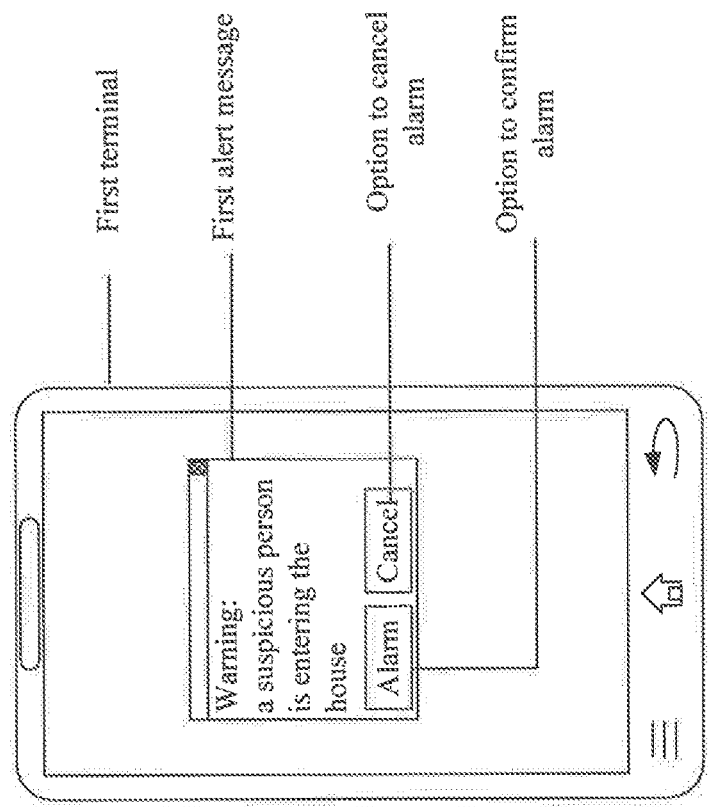
FIG. 4 is a schematic diagram illustrating an application scenario, according to an exemplary embodiment.
Figure 4:
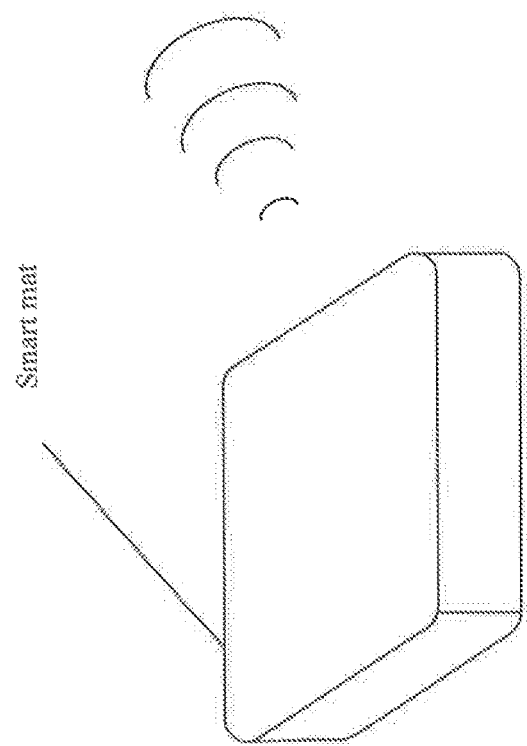

After obtaining the physical characteristic data of the target object, the smart mat may compare the physical characteristic data with multiple sets of physical characteristic data of the target user to calculate differences between them, and may respectively calculate a difference for each type of data if the physical characteristic data includes multiple types of data. If all the calculated differences are less than preset thresholds, it may be determined that the matching condition is satisfied between the obtained physical characteristic data of the target object and that of the target user (that is, the target object is the target user), and the first alert message may not be transmitted to the first terminal. If not all of the calculated differences are less than the preset thresholds, it may be determined that the matching condition between the obtained physical characteristic data of the target object and that of the target user is not met (that is, the target object is not the target user), and the first alert message may be transmitted to the first terminal. The first alert message may be in a variety of forms, such as a short message or a push message. The first alert message may warn the user that a suspicious person is entering the house, as shown in FIG. 4.

In some embodiments, the physical characteristic data range may be used to determine if the preset matching condition is met. Accordingly, the step 102 can include: determining a physical characteristic data range corresponding to pre-stored physical characteristic data of the target user, and transmitting a first alert message to a first terminal if the obtained physical characteristic data of the target object does not fall into the physical characteristic data range.

In an embodiment, after obtaining the physical characteristic data of the target user, the smart mat may determine and store the physical characteristic data range corresponding to the physical characteristic data of the target user. For example, the pressure data of the target user is 800N, and the corresponding pressure range may be determined as 790N~810N. After obtaining the physical characteristic data of the target object, the smart mat may determine whether the obtained physical characteristic data of the target object fails into the determined physical characteristic data range. If the physical characteristic data includes multiple types of data, the smart mat may respectively determine whether each type of data falls into a corresponding physical characteristic data range of the target user. For example, the smart mat may respectively determine whether obtained pressure data falls into the pressure range of the target user, or whether obtained, contact data falls into the contact area range of the target user. If all of the data included in the physical characteristic data falls into the corresponding physical characteristic data range, the smart mat may determine that the matching condition is met, and the first alert message may not be transmitted to the first terminal. If not all of the data included in the physical characteristic data falls into the corresponding physical characteristic data range, the smart mat may determine the matching condition is not met, and the first alert message may be transmitted to the first terminal. The first alert message may be in a variety of forms, such as a short message, or a push message. The first alert message may warn the user that a suspicious person is entering the house, as shown in FIG. 4.

In some embodiments, the physical characteristic data range may be adjusted based on a motion of the user. Corresponding steps may include: obtaining motion data of the target user within a preset time period; and adjusting the physical characteristic data range based on the motion data.

In an embodiment, the smart mat may obtain motion data of the target user within a preset time period. The motion data may include a motion time period, a motion category, a motion intensity, or the like. The smart mat may obtain motion data of the target user via a wearable smart device (e.g. a smart bracelet). The target user may input the motion data through an input component of the smart mat. The smart mat may set different weighted values for different motions, for example, a running motion corresponds to a weighted value 5, a walking motion corresponds to a weighted value 2, a sit-up motion corresponds to a weighted value 4, and an equipment exercise motion corresponds to a weighted value 3. The smart mat may multiply the motion time period of each motion by its corresponding weighted value and the motion intensity, to obtain a total motion value of the target user within the preset time period. The smart mat may preset a corresponding relation between a motion value and an adjusted value of the physical characteristic data range, and then determine an adjusted value of the physical characteristic data range corresponding to the total motion value. The adjusted value may be a value or a ratio. For example, if the target user has a weight data range of 70 kg-72 kg, a total motion value 550, and a corresponding adjusted value −2 kg of physical characteristic data range, it can be determined that the adjusted weight data range is 68 kg-70 kg.

In some embodiments, for the forgoing adjusted physical characteristic data range, the step 102 may include: sending the first alert message to the first terminal if the obtained physical characteristic data of the target object does not fall into an adjusted physical characteristic data range.

In some embodiments, the smart mat may further transmit a preset control command to a controlled device when it is determined that the target object is the target user.

In an embodiment, the controlled device may be: a security device, such as a security door, a security window, or the like; a monitor device, such as a camera, a voice recording device, or the like; or a device with display function, such as a smart television, a tablet computer, or the like. After determining that the matching condition between the obtained physical characteristic data of the target object and the pre-stored physical characteristic data of the target user is not met, the smart mat may transmit the preset control command to the controlled device to safeguard the user's property.

In some embodiments, the target user may determine whether to transmit the control command. Corresponding steps may include: transmitting a preset control command to a controlled device upon receiving an alarm confirmation message transmitted by the first terminal.

In an embodiment, the smart target may transmit a first alert message to a first terminal (e.g. a mobile phone or a bracelet), when it determines that the preset matching condition between the obtained physical characteristic data of the target object and the pre-stored physical characteristic data of the target user is not met. The first alert message may contain an option of confirming alarm and an option of cancelling alarm. The target user may decide whether to trigger an alarm after seeing the first alert message. If the target user decides to trigger an alarm, the target user may click the option of confirming alarm. Correspondingly, the first terminal can transmit a message for confirming alarm to the smart mat, and the smart mat may transmit the preset control command to the controlled device upon receiving the alarm confirmation message. If the target user decides to cancel alarm, the target user may click the option of cancelling alarm. Correspondingly, the target terminal can transmit a message for cancelling alarm to the smart mat, and the smart mat may not transmit the preset control command to the controlled device upon receiving the alarm confirmation message.

In some embodiments, the controlled device may be a monitor device, and corresponding steps may include: transmitting a video recording command to the monitor device.

In an embodiment, the smart target may transmit the video recording command to the monitor device through a Bluetooth or a router, when it determines that the preset matching condition between the obtained physical characteristic data of the target object and the pre-stored physical characteristic data of the target user is not met. The monitor device may record and store a video after receiving the video recording command.

In some embodiments, the controlled device may be a security door and/or a security window, corresponding steps may include: transmitting a lock command to the security door and/or the security window.

Figure 5A:
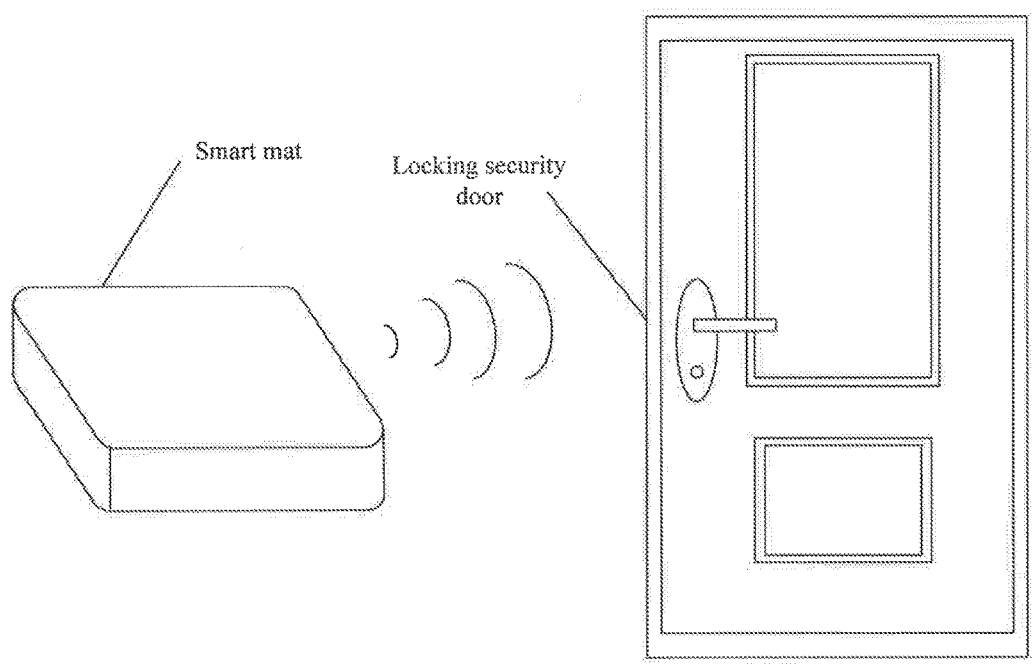

In an embodiment, the smart target may transmit the lock command to the security door and the security window through the Bluetooth or the router when it determines that the preset matching condition between the obtained physical characteristic data of the target object and the pre-stored physical characteristic data of the target user is not met. The security door and the security window may trigger the lock function upon receiving the lock command. At this time, a person in the house cannot leave the house through the security door and the security window, as shown in FIGS. 5a and 5b.

In some embodiments, an alert message may be transmitted to a security network. Corresponding steps may include: transmitting a second alert message to a server of a local security network upon receiving the alarm confirmation message transmitted by the first terminal.

In an embodiment, a residential quarter that the target user resides may be equipped with a security network. The alert message may be transmitted through the security network. Upon receiving a confirmation message transmitted by the first terminal, the smart, mat may obtain an identification of the local security network and transmit the second alert message to the server of the local security network. The second alert message may be an alert message generated based on a preset protocol, containing a location identification, and the location identification may be a network address or a pre-stored residential quarter address (e.g. a building number and an apartment number). The security network may transmit an alert to a corresponding terminal based on the pre-stored terminal identification after receiving the second alert message, and the terminal may be a terminal used by a security guard of the residential quarter, such as a mobile phone, a computer, or the like.

In some embodiments, the smart mat may first determine whether the target user is at home (e.g., the house) before transmitting the alert message. Accordingly, the step 102 may include: obtaining terminal identifications of terminals currently accessing a local area network, and transmitting the first alert message to the first terminal, if the obtained terminal identifications do not contain a terminal identification of the first terminal.

In an embodiment, the smart mat may transmit a request for obtaining the terminal identification to the router of the local area network. The router may transmit the terminal identifications of terminals currently accessing the local area network to the smart mat after receiving the request for obtaining the terminal identification. The smart mat may look for the terminal identification of the first terminal in the received terminal identifications. If the received terminal identifications do not contain the terminal identification of the first terminal, it may imply that the target user is not at home, and the first alert message may be transmitted to the first terminal.

In some embodiments, if the target user is at home, corresponding steps may include: obtaining terminal identifications of terminals currently accessing the local area network, and transmitting the first alert message to a preset second terminal, if the obtained terminal identifications contain a terminal identification of the first terminal and the preset second terminal is in an active state.

Figure 6:
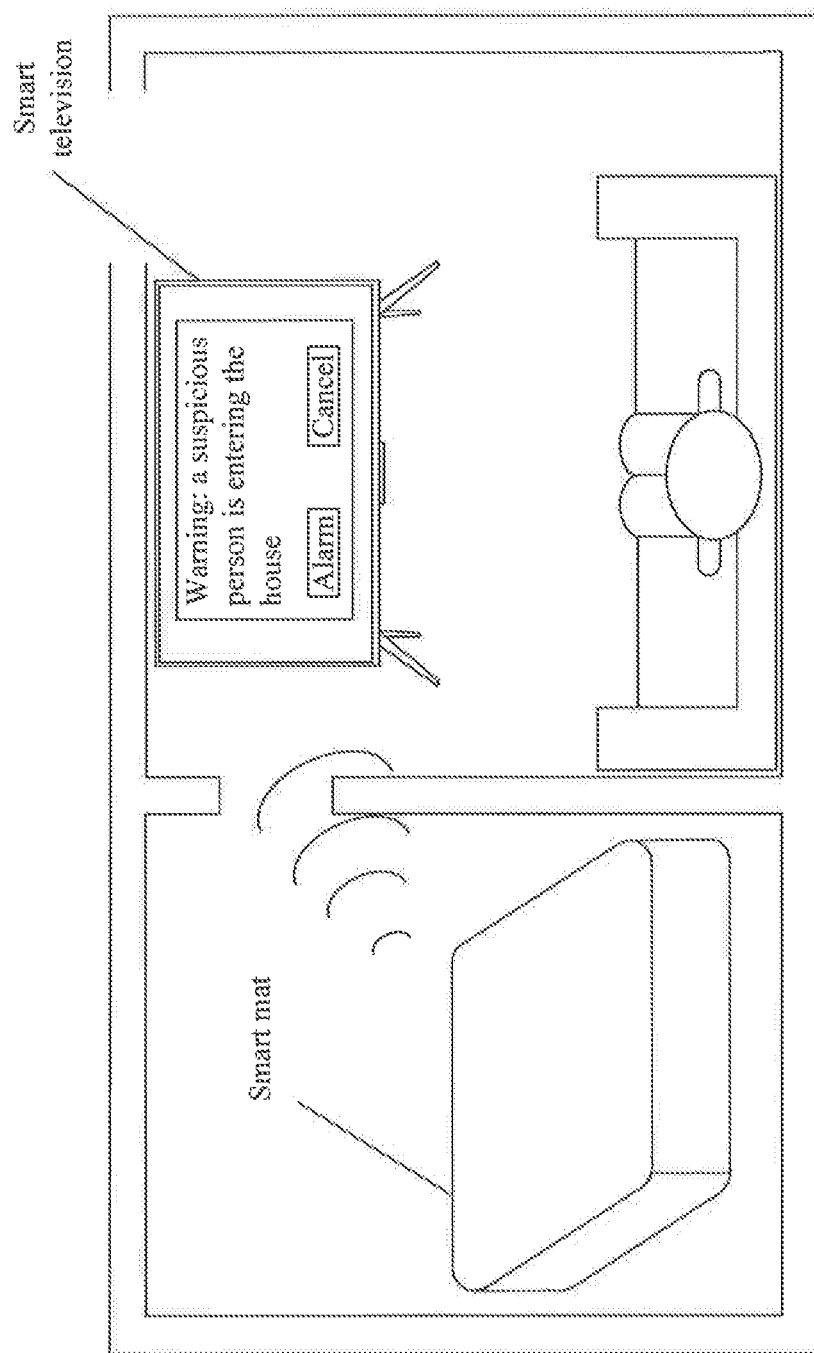
FIG. 6 is a schematic diagram illustrating an application scenario, according to an exemplary embodiment.

In an embodiment, the smart mat may look for the terminal identification. of the first terminal in the received terminal identifications. If the received terminal identifications contain the terminal identification of the first terminal, it may imply that the target user is at home, and it may determine whether the second terminal is in an active state. The second terminal may be another terminal possessing display function or voice reminding function. The second terminal may be a smart television, a tablet computer, a smart air conditioning, or the like. The smart mat may transmit a querying command to the second terminal through a Bluetooth component. If a feedback message from the second terminal is received, the smart mat may determine that the second terminal is in the active state. The smart mat may transmit the first alert message to the second terminal after determining that the second terminal is in the active state. After receiving the first alert message, the second terminal may display contents of the first alert message, or play the contents of the first alert message as a voice mail, as shown in FIG. 6.

In the embodiments of the disclosure, the physical characteristic data of the target object on the target device is obtained, and the first alert message is transmitted to the first terminal, if the obtained physical characteristic data of the target object does not match the pre-stored physical characteristic data of the target user. As such, when a person other than the target user is on the target device, the person may trigger transmitting an alert message to the first terminal, and security of the target user's property can be safeguarded.

Figure 7:
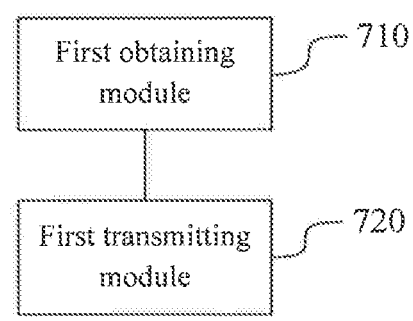
FIG. 7 is a block diagram illustrating a device for transmitting an alert message, according to an exemplary embodiment.

Another exemplary embodiment of the disclosure further provides a device for transmitting an alert message, as shown in FIG. 7. The device may include a first obtaining module 710 and a first transmitting module 720.

The first obtaining module 710 may be configured to obtain physical characteristic data of a target object on a target device. The first transmitting module 720 may be configured to transmit a first alert message to a first terminal, if a preset matching condition between the obtained physical characteristic data of the target object and pre-stored physical characteristic data of a target user is not met.

In some embodiments, the first obtaining module 710 may be configured to: detect a pressure, a contact area, and a temperature of the target object on the target device, and determine the target object to be a person and obtain the physical characteristic data of the target object, if the pressure, the contact area, and the temperature of the target object meet a preset physical characteristic condition.

Figure 8:
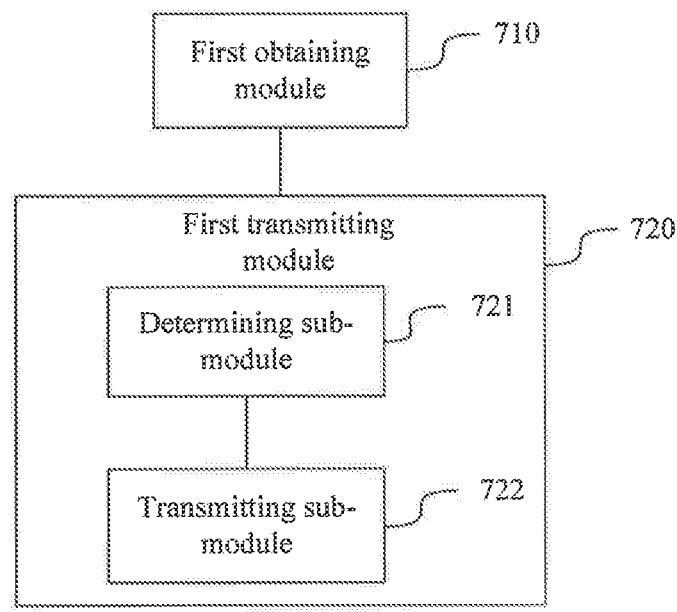
FIG. 8 is a block diagram illustrating a device for transmitting an alert message, according to an exemplary embodiment.

In some embodiments, as shown FIG. 8, the first transmitting module 720 may include: a determining sub-module 721 configured to determine a physical characteristic data range corresponding to the pre-stored physical characteristic data of the target user, and a transmitting sub-module 722 configured to transmit the first alert message to the first terminal, if the physical characteristic data of the target object is not within the physical characteristic data range.

Figure 9:
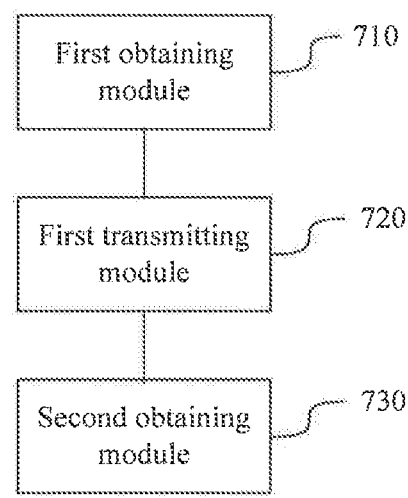
FIG. 9 is a block diagram illustrating a device for transmitting an alert message, according to an exemplary embodiment.

In some embodiments, as shown FIG. 9, the device for transmitting an alert message may further include a second obtaining module 730 configured to obtain motion data of the target user within a preset time period, and adjust the physical characteristic data range based on the motion data.

The first transmitting module 720 may be configured to transmit the first alert message to the first terminal, if the physical characteristic data of the target object is not within the adjusted physical characteristic data range.

Figure 10:
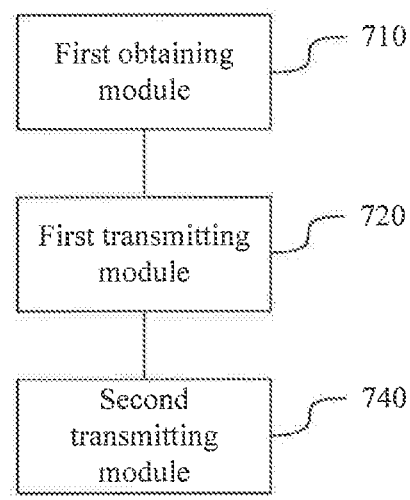
FIG. 10 is a block diagram illustrating a device for transmitting an alert message, according to an exemplary embodiment.

In some embodiments, as shown FIG. 10, the device for transmitting an alert message may further include a second transmitting module 740 configured to transmit a preset control command to a controlled device.

In some embodiments, the second transmitting module 740 may be configured to transmit the preset control command to the controlled device upon receiving an alarm confirmation message transmitted by the first terminal.

In some embodiments, the second transmitting module 740 may be configured to transmit a video recording command to a monitor device.

In some embodiments, the second transmitting module 740 may be configured to transmit a lock command to a security door and/or a security window.

Figure 11:
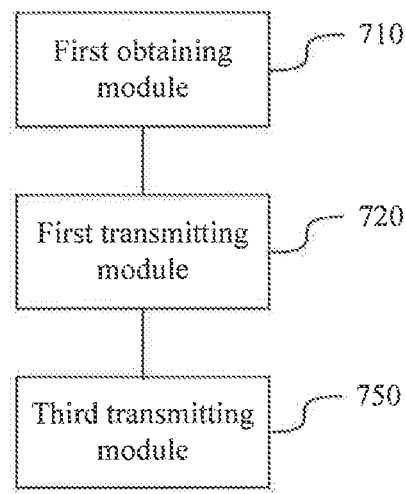
FIG. 11 is a block diagram illustrating a device for transmitting an alert message according to an exemplary embodiment.

In some embodiments, as shown FIG. 11, the device for transmitting an alert message may further include a third transmitting module 750 configured to transmit a second alert message to a server of a local security network upon receiving the alarm confirmation message transmitted by the first terminal.

In some embodiments, the first transmitting module 720 may be configured to obtain terminal identifications of terminals currently accessing a local area network, and transmit the first alert message to the first terminal, if the obtained terminal identifications do not contain a terminal identification of the first terminal.

For the devices of forgoing embodiments, corresponding operations of each module have been described in detail in the method embodiments, and are not repeated here.

In the embodiments of the disclosure, physical characteristic data of the target object on the target device can be obtained, a first alert message can be transmitted to the first terminal, if the obtained physical characteristic data of the target object does not match the pre-stored physical characteristic data of the target user. As such, the first terminal may be triggered to transmit the first alert message when an intruder to detected attempting to enter a house, so that the target user's property can be safeguarded.

Figure 12:
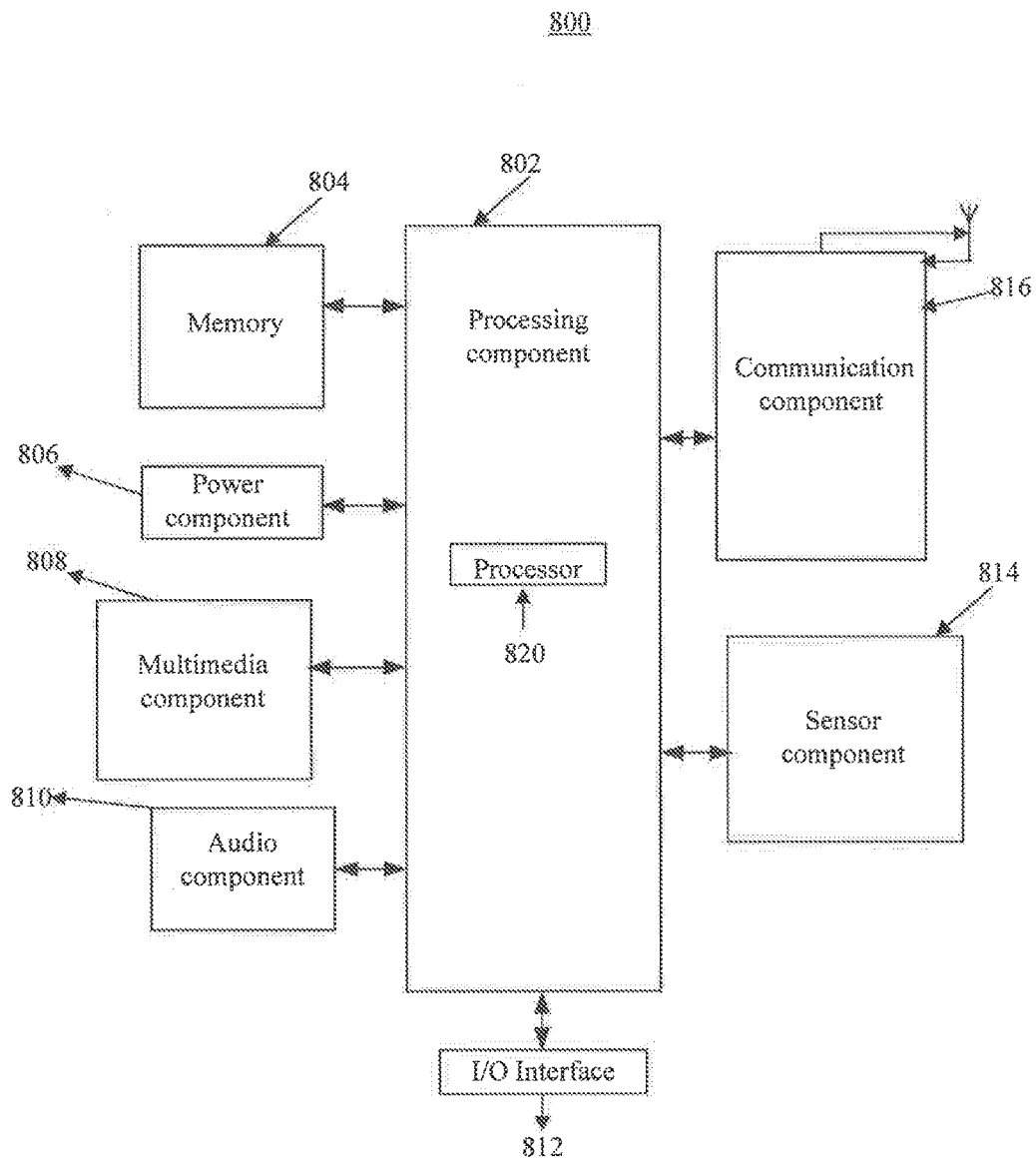
FIG. 12 is a block diagram illustrating a target device, according to an exemplary embodiment.

FIG. 12 is a block diagram of a target device 800, according to an exemplary embodiment. For example, the target device 800 may be a smart mat.

Referring to FIG. 12, the target device 800 may include one or more of the following components: a processing component 802, a memory 804, a power component 806, a multimedia component. 808, an audio component 810, an input/output (I/O) interface 812, a sensor component 814, and a communication component 816.

The processing component 802 may be configured to control overall operations of the target device 800, such as the operations associated with display, telephone calls, data communications, camera operations, and recording operations. The processing component 802 may include one or more processors 820 to execute instructions to implementation all or part of the steps in the above described methods. Moreover, the processing component 820 may include one or more modules which facilitate the interaction between the processing component 802 and other components. For instance, the processing component 802 may include a multimedia module to facilitate the interaction between the multimedia component 808 and the processing component 802.

The memory 804 may be configured to store various types of data to support the operation of the device 800. Examples of such data include instructions for any applications or methods operated on the device 800, contact data, phonebook data, messages, pictures, video, etc. The memory 804 may be a non-transitory computer readable storage medium. The memory 804 may be implemented using any type of volatile or nom-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the target device 800. The power component 806 may include a power management system, one or more power sources, and any other components associated with the generation, management, and distribution of power for the target device 800.

The multimedia component 808 may include a screen providing an output interface between the target device 800 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 may include a front camera and/or a rear camera. The front camera and the rear camera may receive an external multimedia datum while the device 800 is in an operation mode, such as a photographing mode or a video mode. Each of the front camera and the rear camera may be a fixed optical lens system or have optical focusing and zooming capability.

The audio component 810 may be configured to output and/or input audio signals. For example, the audio component 810 may include a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 may further include a speaker to output audio signals.

The I/O interface 812 may provide an interface between the processing component 802 and peripheral interface modules, the peripheral interface modules being, for example, a keyboard, a click wheel, buttons, and the like. The buttons may include, but are not limited to, a home button, a volume button, a starting button, and a locking button.

The sensor component 814 may include one or more sensors to provide status assessments of various aspects of the target device 800. For instance, the sensor component 814 may detect an open/closed status of the target device. 800, relative positioning of components (e.g., the display and the keypad, of the target device 800), a change in position of the target device 800, or a component of the device 800, a presence or absence of user contact with the target device 800, an orientation or an acceleration/deceleration of the target device 800, and a change in temperature of the target device 800. The sensor component 814 may include a proximity sensor configured to detect the presence of a nearby object without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 may be configured to facilitate communication, wired or wirelessly, between the target device 800 and other devices. The target device 800 can access a wireless network based on a communication standard, such as WiFi, 2G or 3G or a combination thereof. In an exemplary embodiment, the communication component 816 may receive a broadcast signal or broadcast associated information from an external broadcast management system via a broadcast channel. In an exemplary embodiment, the communication component 816 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the target device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium storing instructions, such as included in the memory 804, executable by the processor 820 in the target device 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium having stored therein instructions that, when executed by a processor of the target device, may cause the target device to perform a method including: obtaining physical characteristic data of a target object on a target device, and transmitting a first alert message to a first terminal, if a preset matching condition between the obtained physical characteristic data of the target object and pre-stored physical characteristic data of a target user is not met.

In some embodiments, obtaining the physical characteristic data of the target object on the target device may include: detecting a pressure, a contact area and a temperature of the target object on the target device, and determining the target object to be a person and obtaining the physical characteristic data of the target object, if the pressure, the contact area, and the temperature of the target object meet a preset physical characteristic condition.

In some embodiments, transmitting the first alert message to the first terminal, if the obtained physical characteristic data of the target object does not match the pre-stored physical characteristic data of the target user includes: determining a physical characteristic data range corresponding to the pre-stored physical characteristic data of the target user, and transmitting the first alert message to the first terminal, if the physical characteristic data of the target object is not within the physical characteristic data range.

In some embodiments, the method may further include: obtaining motion data of the target user within a preset time period, and adjusting the physical characteristic data range based on the motion data.

Transmitting the first alert message to the first terminal, if the obtained physical characteristic data of the target object is within the physical characteristic data range may include: transmitting the first alert message to the first terminal, if the obtained physical characteristic, data of the target object is not within the adjusted physical characteristic data range.

In some embodiments, the method may further include: transmitting a preset control command to a controlled device.

In some embodiments, transmitting the preset control command to the controlled device may include: transmitting the preset control command to a controlled device upon receiving an alarm confirmation message transmitted by the first terminal.

In some embodiments, transmitting the preset control command to the controlled device may include: transmitting a video recording command to a monitor device.

In some embodiments, transmitting the preset control command to the controlled device may include: transmitting a lock command to a security door and/or a security window.

In some embodiments, the method may further include transmitting a second alert message to a server of a local security network upon receiving the alarm confirmation message transmitted by the first terminal.

In some embodiments, transmitting the first alert message to the first terminal may include: obtaining terminal identifications of terminals currently accessing a local area network, and transmitting the first alert message to the first terminal, if the obtained terminal identifications do not containing a terminal identification of the first terminal.

The method further includes: obtaining terminal identifications of terminals currently accessing the local area network.; and transmitting the first alert message to a preset second terminal, if the obtained terminal identifications contain a terminal identification of the first terminal and the preset second terminal is in an active state.

In the embodiments of the disclosure, physical characteristic data of the target object on the target device can be obtained, a first alert message is transmitted to the first terminal, if the physical characteristic data of the target object does not match the pre-stored physical characteristic data of the target user. As such, when a person other than the target user lands on the target device, it may trigger the first terminal to transmit the first alert message, and the target user's property can be safeguarded.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting an alert message, comprising:
    obtaining physical characteristic data of a target object on a target device; and
    transmitting a first alert message to a first terminal, if the obtained physical characteristic data of the target object does not match pre-stored physical characteristic data of a target user,
    wherein transmitting the first alert message to the first terminal, if the obtained physical characteristic data of the target object does not match the pre-stored physical characteristic data of the target user includes:
        determining a physical characteristic data range corresponding to the pre-stored physical characteristic data of the target user, and
        transmitting the first alert message to the first terminal, if the physical characteristic data of the target object is not within the physical characteristic data range;
    the method further comprising:
        obtaining motion data of the target user within a preset time period;
        adjusting the physical characteristic data range based on the motion data; and
        transmitting the first alert message to the first terminal, if the physical characteristic data of the target object is not within the adjusted physical characteristic data range.

2. The method of claim 1, wherein obtaining the physical characteristic data of the target object on the target device comprises:
    detecting a pressure, a contact area, and a temperature of the target object; and
    if the pressure, the contact area, and the temperature of the target object meet a preset physical characteristic condition, determining the target object to be a person and obtaining the physical characteristic data of the target object.

3. The method of claim 1, further comprising:
    transmitting a preset control command to a controlled device.

4. The method of claim 3, wherein transmitting the preset control command to the controlled device comprises:
    transmitting the preset control command to the controlled device upon receiving an alarm confirmation message transmitted by the first terminal.

5. The method of claim 3, wherein transmitting the preset control command to the controlled device comprises:
    transmitting a video recording command to a monitor device.

6. The method of claim 3, wherein transmitting the preset control command to the controlled device comprises:
    transmitting a lock command to a security door and/or a security window.

7. The method of claim 1, further comprising:
    transmitting a second alert message to a server of a local security network upon receiving an alarm confirmation message transmitted by the first terminal.

8. The method of claim 1, further comprising:
    obtaining terminal identifications of terminals currently accessing a local area network; transmitting the first alert message to the first terminal, if the obtained terminal identifications do not contain a terminal identification of the first terminal, and
    transmitting the first alert message to a preset second terminal, if the obtained terminal identifications contain a terminal identification of the first terminal and the second terminal is in an active state.

9. A device for transmitting an alert message, comprising:
    a processor; and
    a memory for storing processor-executable instructions,
    wherein the processor is configured to:
        obtain physical characteristic data of a target object on a target device; and
        transmit a first alert message to a first terminal, if the obtained physical characteristic data of the target object does not match pre-stored physical characteristic data of a target user,
        wherein in transmitting the first alert message to the first terminal, if the obtained physical characteristic data of the target object does not match the pre-stored physical characteristic data of the target user, the processor is further configured to:
            determine a physical characteristic data range corresponding to the pre-stored physical characteristic data of the target user, and
            transmit the first alert message to the first terminal, if the physical characteristic data of the target object is not within the physical characteristic data range;

wherein the processor is further configured to:
obtain motion data of the target user within a preset time period;
adjust the physical characteristic data range based on the motion data; and
transmit the first alert message to the first terminal, if the physical characteristic data of the target object is not within the adjusted physical characteristic data range.

10. The device of claim 9, wherein the processor is further configured to:
detect a pressure, a contact area, and a temperature of the target object; and
if the pressure, the contact area, and the temperature of the target object meet a preset physical characteristic condition, determine the target object to be a person and obtain the physical characteristic data of the target object.

11. The device of claim 9, wherein the processor is further configured to:
transmit a preset control command to a controlled device.

12. The device of claim 11, wherein the processor is further configured to transmit the preset control command to the controlled device upon receiving an alarm confirmation message transmitted by the first terminal.

13. The device of claim 11, wherein the processor is further configured to transmit a video recording command to a monitor device.

14. The device of claim 11, wherein the processor is further configured to transmit a lock command to a security door and/or a security window.

15. The device of claim 9, wherein the processor is further configured to:
transmit a second alert message to a server of a local security network upon receiving an alarm confirmation message transmitted by the first terminal.

16. The device of claim 9, wherein the processor is further configured to:
obtain terminal identifications of terminals currently accessing a local area network;
transmit the first alert message to the first terminal, if the obtained terminal identifications do not contain a terminal identification of the first terminal; and
transmit the first alert message to a preset second terminal, if the obtained terminal identifications contain a terminal identification of the first terminal and the second terminal is in an active state.

* * * * *